United States Patent
Lim (10) Patent No.: US 8,626,180 B2
(45) Date of Patent: Jan. 7, 2014

(54) METHOD FOR SETTING UP A CHANNEL BETWEEN FEMTO BASE STATIONS

(75) Inventor: Jaewon Lim, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 13/521,015

(22) PCT Filed: Jan. 19, 2011

(86) PCT No.: PCT/KR2011/000393
§ 371 (c)(1),
(2), (4) Date: Nov. 30, 2012

(87) PCT Pub. No.: WO2011/105699
PCT Pub. Date: Sep. 1, 2011

(65) Prior Publication Data
US 2013/0072206 A1    Mar. 21, 2013

Related U.S. Application Data (60) Provisional application No. 61/306,959, filed on Feb. 23, 2010.

(51) Int. Cl.
*H04W 72/00* (2009.01)
(52) U.S. Cl.
USPC ............ 455/450; 455/509; 455/556.1; 455/7; 455/41.2
(58) Field of Classification Search
USPC ............................ 455/450, 509, 556.1, 7, 41.2
See application file for complete search history.

(56) References Cited

U.S. PATENT DOCUMENTS

| 2008/0039086 A1 | 2/2008 | Gallagher et al. |
| 2008/0261602 A1* | 10/2008 | Livneh .................. 455/442 |
| 2011/0064021 A1* | 3/2011 | Patini ..................... 370/328 |
| 2013/0018843 A1* | 1/2013 | Bultman et al. ............ 707/609 |

FOREIGN PATENT DOCUMENTS

| KR | 10-2009-0043226 A | 5/2009 |
| KR | 10-2009-0060405 A | 6/2009 |

* cited by examiner

*Primary Examiner* — Barry Taylor
(74) *Attorney, Agent, or Firm* — Birch, Stewart, Kolasch & Birch, LLP

(57) ABSTRACT

A method in which a first femto base station sets up a channel with another femto base station. The method includes transmitting, from the first femto base station to a femto control station, information on a first smart meter to which the first femto base station is connected; transmitting, from the first femto base station to the femto control station, information on one or more other femto base stations which are neighbors of the first femto base station; receiving by the first femto base station from the femto control station, information on a second smart meter to which one or more other femto base stations are connected; and determining, by the first femto base station whether or not to set up a channel through the first smart meter and the second smart meter, if data to be transmitted to said other femto base stations exists.

15 Claims, 8 Drawing Sheets

METHOD FOR SETTING UP A CHANNEL BETWEEN FEMTO BASE STATIONS

CROSS REFERENCE TO RELATED APPLICATIONS

This application is the National Phase of PCT/KR2011/000393 filed on Jan. 19, 2011, which claims priority under 35 U.S.C. 119(e) to U.S. Provisional Application No. 61/306,959 filed on Feb. 23, 2010, all of which is hereby expressly incorporated by reference into the present application.

TECHNICAL FIELD

The present invention relates to a mobile communications system, and more particularly, to femto base stations in a mobile communications system.

BACKGROUND ART

Second generation mobile communication indicates transmitting and receiving (transceiving) voice signals in a digital manner, which includes CDMA, GSM, and so on. GPRS advanced from the GSM has been proposed. The GPRS is technology for providing packet switched data service based on the GSM system.

Third generation mobile communication indicates transceiving images and data, as well as voice signals. Third Generation Partnership Project (3GPP) has developed mobile communication system (IMT-2000) technology, and has adopted WCDMA as Radio Access Technology (RAT). In Europe, the IMT-2000 technology and the RAT (e.g., WCDMA) are referred to as Universal Mobile Telecommunication System (UMTS). And, UTRAN is an abbreviated term of UMTS Terrestrial Radio Access Network.

The third generation mobile communication is being evolved into fourth generation mobile communication.

As the fourth generation mobile communication, Long-Term Evolution (LTE) Network technology being standardized in 3GPP, and IEEE 802.16 technology being standardized in IEEE have been proposed. In the LTE, the term of E-UTRAN (Evolved-UTRAN) is used.

The fourth generation mobile communication technology has introduced OFDM (Orthogonal Frequency Division Multiplexing)/OFDMA (Orthogonal Frequency Division Multiple Access). In the OFDM, plural orthogonal subcarriers are used. The OFDM uses an orthogonal characteristic of IFFT (inverse fast Fourier Transform) and FFT(fast Fourier Transform). A transmitter transmits data after performing IFFT, and a receiver restores the original data by performing FFT with respect to a received signal. The transmitter uses IFFT for combination of a plurality of sub carriers, and the receiver uses corresponding FFT for separation of a plurality of sub carriers.

Attempts to increase a cell capacity are ongoing so as to support high capacity service and bi-directional service such as multimedia contents and streaming, in the third or fourth generation mobile communication system.

For increase of the cell capacity, there have been proposed methods for using a high frequency band and reducing a cell radius. If a cell having a small radius (e.g., pico cell) is applied, a frequency band higher than the existing one used in a cellular system can be obtained. This can allow much information to be transmitted. However, in this case, there is a disadvantage that high costs are required since more base stations should be installed on the same area.

As one of the approaches to increase the cell capacity using a small cell, there have been proposed a femto cell.

The femto cell indicates a miniaturized mobile communication base station connected to a mobile communication core network via a broadband network installed inside home, an office, etc. Such femto cell has advantages that indoor coverage is increased, the call quality is enhanced, and various wired/wireless convergence services are efficiently provided.

3GPP WCDMA and LTE groups are performing standardization with respect to the femto cell in the name of Home eNodeB, and 3GPP2 is also actively doing research on the femto cell.

In the 3GPP, the femto cell is categorized into a closed subscriber group (CSG) femto cell, and an open access femto cell according to an accessible status. In case of the CSG femto cell, only terminals (user equipment) allowed to access a corresponding femto cell can access the femto cell. The open access femto cell indicates a femto cell which provides limitless service to all terminals which can receive service.

Also, the 3GPP allocates a CSG ID to a femto cell for identification of a CSG femto cell, and defines Femto-cell White List, the list including CSG IDs of femto cells, the ID by which a corresponding terminal can access USIM (universal subscriber identity module) of a femtocell-supported terminal. A corresponding femto cell periodically transmits the CSG IDs using a control channel, so that a CSG femto cell of a mobile terminal can be identified.

Figure 1:
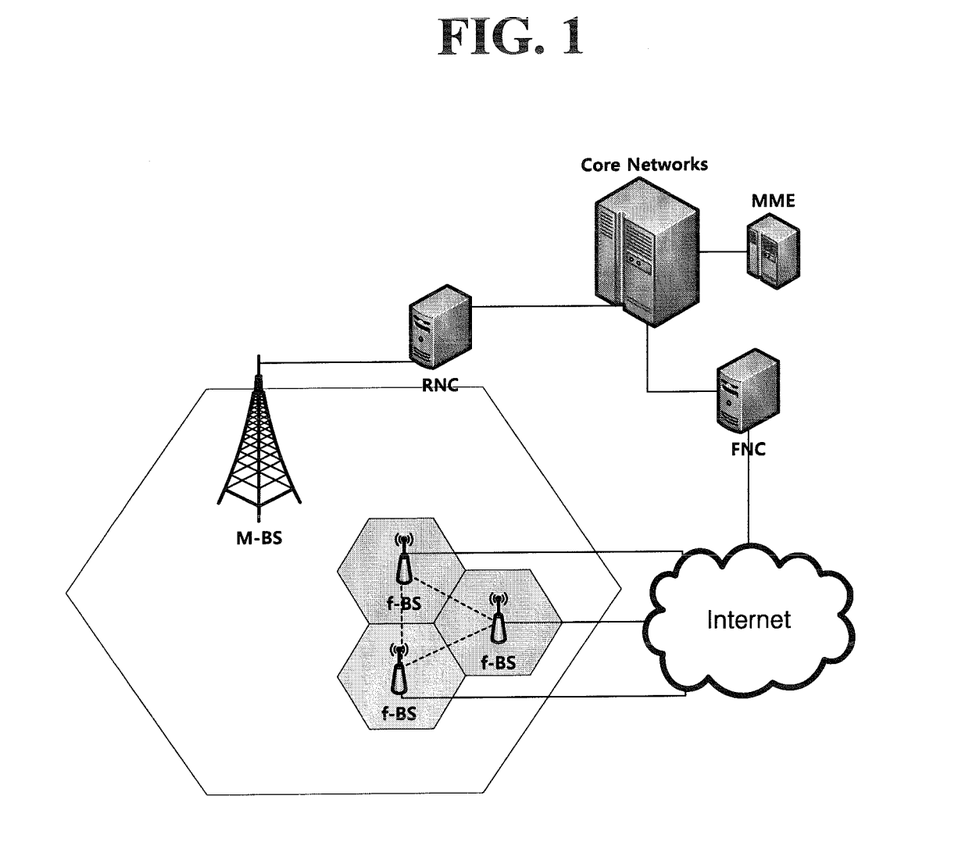
FIG. 1 is an exemplary view illustrating a femto-cell based network structure in accordance with the conventional art.
Figure 2:
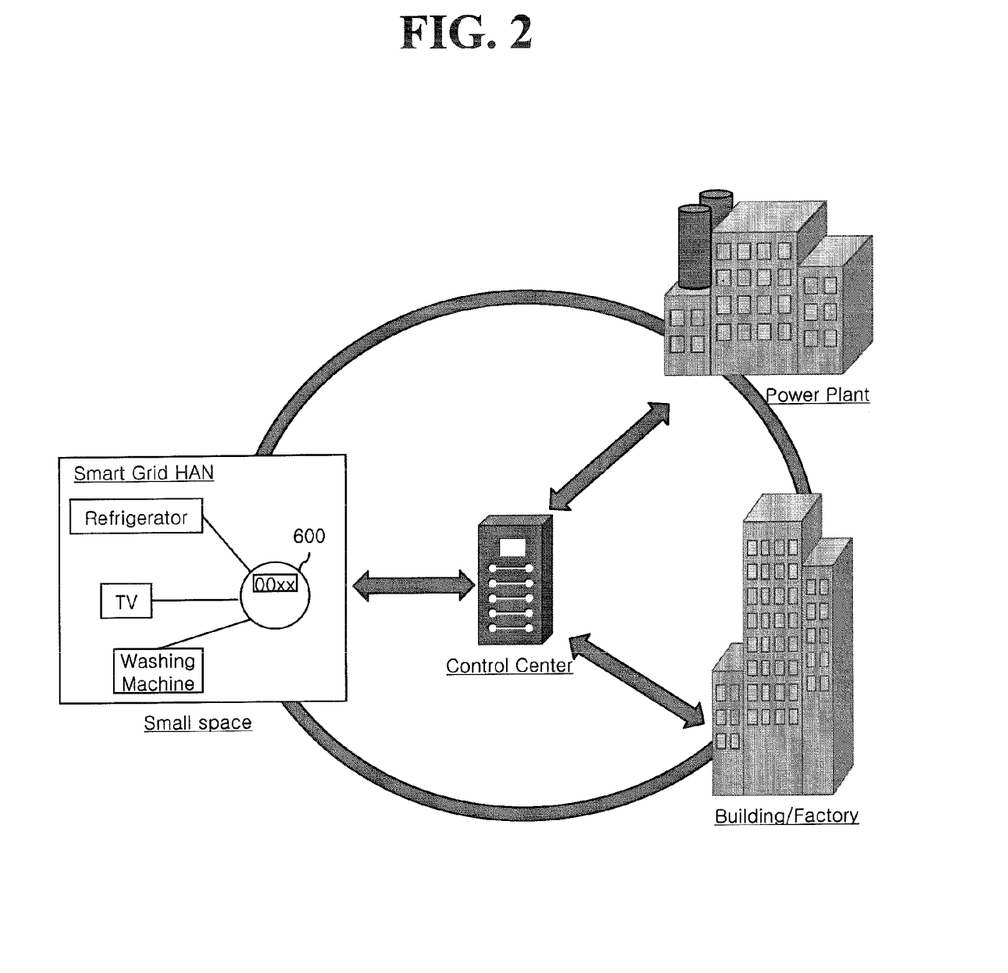
FIG. 2 is a view illustrating a handover process in a system of FIG. 1.

As methods for applying such femto cell to the existing mobile communication network, various structures shown in FIGS. 1 and 2 have been proposed.

FIG. 1 is an exemplary view illustrating a femto-cell based network structure in accordance with the conventional art.

FIG. 1 illustrates a macro base station (M-BS) which provides service onto a wide area, and a plurality of femto base stations (f-BS) installed based on a user.

The femto base station (f-BS) is connected to femtocell network controller (FNC) via the Internet thus to be controlled, and provides service to a user.

The function and specification of the FNC are differently defined in various standards. In this disclosure, the FNC is defined as a cellular network entity having a function to control femto base stations. For instance, in case of 3GPP LTE, the FNC may be implemented as MME(Mobility Management Entity) of a core network, or HeNB Gateway having functions to control femto cells and to perform traffic processing.

A mobile terminal measures signals of neighbor cells, and transmits the measured signals to femto base stations thereof. And, the femto base stations identify and manage the neighbor cells. And, the femto base stations exchange information with each other through a direct link, or through an indirect link via the FNC. And, the femto base station and the macro base station exchange information with each other, via the FNC or RNC (Radio Network Controller), or MME (Mobility Management Entity) which controls the femto base station in a mobile communication network.

Standardization groups such as IEEE 802.16m and 3GPP LTE are doing research on cooperative communication and data transmission between neighbor femto cells.

The first reason why cooperative communication is required between neighbor femto cells is in order to prevent degradation of radio communication environment of each femto cell due to interference, when femto cells are positioned close to each other. Many methods have been proposed in order to solve such interference between the neighbor cells. And, required control data should be transmitted between femto cells.

The second reason why cooperative communication is required between neighbor femto cells is in order to support rapid handover (HO) between two femto cells. In the conventional handover method applied when a terminal moves between macro base stations (Macro BS), handover of the terminal is rapidly performed, because the terminal's data required to perform the handover is transmitted via a backbone network of the macro base stations which can guarantee QoS. However, when handover of the terminal is performed between neighbor femto cells, the femto cells transmit data required to perform the handover, to a neighbor base station, via a cellular core network, through a wired broadband network which cannot guarantee QoS. This may cause the occurrence of handover delay. Research on such inter-femtocell handover is being actively done by 3GPP LTE RAN3 WG, on the topic of "HeNB Mobility Enhancement".

The third reason why cooperative communication is required between neighbor femto cells is in order to transmit user data between neighbor femto cells. In the occurrence of data communication between terminals connected to neighbor femto cells, respectively, corresponding data is transmitted to a neighbor femto cell, through a broadband network of the femto cell, via a cellular core network, and through the broadband network again. In this case, data transmission delay may occur. In order to solve such problem, required is rapid data transmission via channels directly connected between neighbor femto cells.

Currently, 3GPP LTE SA2 WG is doing research on such problem of direct data transmission between femto cells, on the topic of "Local IP Access (LIPA)".

The direct communication between femto cells which have been researched so far relates to channel setup using radio resources. However, it is difficult to implement such direct communication due to the following problems, such as a problem of frequency resource allocation, a scheduling problem, a hidden node problem that femto cells are located at positions where direct communication cannot be performed in spite of overlapped coverage.

DISCLOSURE OF THE INVENTION

Therefore, an object of one embodiment of the present invention is to provide a method capable of allowing neighbor femto cells to efficiently perform direct communication with each other.

To achieve the above purpose, one embodiment of the present invention provides an architecture capable of allowing direct communication between neighbor femto cells with each other. Also, to achieve the above purpose, one embodiment of the present invention provides a method capable of allowing direct communication between neighbor femto cells with each other.

More specifically, one embodiment of the present invention proposes a method for implementing channel setup between neighbor femto cells, via a smart grid network. That is, the present invention provides a data transception method between neighbor femto cells via NAN or WAN of a smart grid network, when a direction communication channel is required between neighbor femto cells.

More specifically, one embodiment of the present invention provides a method in which a first femto base station sets up a channel with another femto base station. The method comprises: transmitting, from the first femto base station to a femto control station, information on a first smart meter to which the first femto base station is connected; transmitting, from the first femto base station to the femto control station, information on one or more other femto base stations which are neighbors of the first femto base station; receiving by the first femto base station from the femto control station, information on a second smart meter to which said one or more other femto base stations are connected; determining, by the first femto base station whether or not to set up a channel through the first smart meter and the second smart meter, if data to be transmitted to said other femto base stations exists; transmitting, from the first femto base station to the first smart meter, a channel setup request message containing information on said other femto base stations and information on the second smart meter in accordance with the result of the determination; and transceiving, by the first femto base station the data to/from said other femto base stations via the channel setup through the first smart meter and the second smart meter, when a response message is received from said other femto base stations through the first smart meter.

The information on the first smart meter may be transmitted while being included in a status report message. The information on said one or more other femto base stations may be transmitted while being included in a measurement report message. The information on the second smart meter may be received while being included in a system information message about neighbor cells. The system information message may further include at least one of information on said other femto base stations, and an identifier inside a smart grid zone where the smart meter is located.

The channel setup request message may further include at least one of information on the first femto base station, a parameter indicating a channel setup reason, and an identifier inside a smart grid zone where the smart meter is located.

The information on said one or more other femto base stations may be obtained through measurement by the first femto base station, or may be obtained through measurement by a terminal connected to the first femto base station.

Another embodiment of the present invention provides a method for setting up a channel between femto base stations, in which a first smart meter connected to a first femto base station sets up a channel for the first femto base station. The method comprises: transmitting, from the first smart meter, to a first femto base station connected to the first smart meter, information on the first smart meter; receiving, by the first smart meter and from the first femto base station, a connection request message with a second femto base station; a step in which the first smart meter identifies, based on the connection request message, a second smart meter to which the second femto base station is connected; and transmitting, from the first smart meter, to the identified second smart meter, the connection request message.

Still another embodiment of the present invention provides a femto base station. The femto base station comprises: a transceiver configured to transmit, to a femto control station, information on a first smart meter to which the femto base station is connected, and information on one or more other femto base stations which are neighbors of the femto base station, and configured to receive, from the femto control station, information on a second smart meter to which said one or more other femto base stations are connected; and a processor configured to determine whether to setup a channel through the first smart meter and the second smart meter, if data to be transmitted to said other femto base stations exists.

The transceiver can transmit, to the first smart meter, a channel setup request message including information on said other femto base stations, and information on the second smart meter, based on the determination result by the processor. And, the transceiver can transceive the data to/from said other femto base stations via the channel setup through the first smart meter and the second smart meter, when a response message is received from said other femto base stations through the first smart meter.

EFFECTS OF THE INVENTION

According to one embodiment of the present invention, data communication can be more rapidly performed via a smart grid network, if direct communication between femto cells is required for interference control, rapid handover, and user data.

MODES FOR CARRYING OUT THE PREFERRED EMBODIMENTS

Unless differently defined, all the terms used herein with including technical or scientific terms have the same meaning as terms generally understood by those skilled in the art relating to the field of the present invention. Terms defined in a general dictionary should be understood so as to have the same meanings as contextual meanings of the related art. Unless definitely defined in the present invention, the terms are not interpreted as ideal or excessively formal meanings. Furthermore, when the technical terms used in the present invention are unsuitable technical terms that do not precisely express the techniques of the present invention, the unsuitable technical terms should be replaced by suitable technical terms that can be understood by those skilled in the art. The general terms used in the present invention should be interpreted based on the previous or next contexts, but should not be interpreted as an excessively narrowed meaning.

A singular expression includes a plural concept unless there is a contextually distinctive difference therebetween. In the present invention, a term of "include" or "have" should not be interpreted as if it absolutely includes a plurality of components or steps of the specification. Rather, the term of "include" or "have" may not include some components or some steps, or may further include additional components.

Though terms of 'first', 'second', etc. are used to explain various components, the components are not limited to the terms. The terms are used only to distinguish one component from another component. For example, a first component may be referred to as a second component, or similarly, the second component may be referred to as the first component within the scope of the present invention.

When it is mentioned that one component is "connected" or "accessed" to another component, it may be understood that the one component is directly connected or accessed to said another component or that still other component is interposed between the two components. In the meantime, when it is mentioned that one component is "directly connected" or "directly accessed" to another component, it may be understood that no component is interposed therebetween.

Hereinafter, preferred embodiments of the present invention will be explained in more detail with reference to the attached drawings. The same or similar components of one embodiment as or to those of another embodiment will be provided with the same or similar reference numerals, and their detailed explanations will be omitted. And, if it is regarded that detailed descriptions of the related art are not within the range of the present invention, the detailed descriptions will be omitted. Furthermore, it should also be understood that embodiments are not limited by any of the details of the foregoing description, but rather should be construed broadly within its spirit and scope and it is intended that the present invention cover modifications and variations of this invention provided they come within the scope of the appended claims and their equivalents Hereinafter, the term of a terminal will be used. Such terminal may be referred to as a User Equipment (UE), a Mobile Equipment (ME) and a Mobile Station (MS). And, the terminal may be a portable device such as a portable phone, a PDA, a smart phone and a notebook, or may be an unportable device such as a PC and a vehicle-mounted device.

Hereinafter, the term of 'femto base station' is used. The femto base station may be referred to as Home (e)NodeB.

Hereinafter, the present invention will be explained in more details with reference to the attached drawings.

FIG. 2 illustrates the concept of recently-proposed Smart Grid.

The smart grid indicates a next generation power network for optimizing energy efficiency by real-time exchanging information bi-directionally between a power provider and a consumer, through the convergence of IT technology and the existing power network, such as a power plant, a substation, a transmission site and a power consumer. Therefore, efficiency can be enhanced as the power provider and the consumer interwork with each other.

For explanation about the smart grid, the current power system should be firstly explained. Electricity to be used is designed to be more than the actual usage amount by about 10%. The reason is in order to obtain additional electricity in preparation for a power usage amount more than a preset maximum consumption amount. Each type of power generation equipment as well as fuel is additionally required. However, the waste amount of electricity is great, resulting in degradation of energy efficiency. Furthermore, while coal, oil, gas, etc are burned, the exhaustion amount of carbon dioxide also increases.

Therefore, electricity can be more efficiently used and global warming can be prevented, if electricity is generated as much as it is required, or if electricity is used in accordance with the generated quantity. To this end, IT technology is applied to a power network so that the electricity usage amount, the supply amount and a power line status can be identified, which is called Smart Grid technology.

According to such smart grid technology, consumers can use electricity when electricity bills are low, and can control electronic products to automatically operate at times when electricity bills are low.

Power producers can elastically control the power supply amount since they can real time identify power usage situations. Since the maximum power amount needs not be maintained at times when electricity usage is little, the waste amount of electricity can be reduced. Furthermore, stored electricity can be elastically supplied at times when electricity usage is much. And, a breakdown of a power network due to an overload can be prevented.

Smart meter 600, one of network components of the smart grid is an apparatus serving to distinguish a provider and a user from each other. The smart meter 600 performs managements, monitoring and controls with respect to a user's energy supply and demand.

The smart meter 600 may perform functions such as electricity reading, demand response commands, pricing information, and connect/disconnect commands. The smart meter 600 constitutes a Home Area Network (HAN) by being connected to a home appliance, such as a refrigerator, a television and a washing machine. And, the smart meter 600 may be connected to a micro grid.

For connection with devices inside the HAN, the smart meter 600 may use a wireless communication method such as Zigbee and WiFi, and may use a wired communication method such as Power Line Communication (PLC).

The smart meter 600 can perform bi-directional communications with a provider or other smart meters via a smart grid network.

Figure 4:
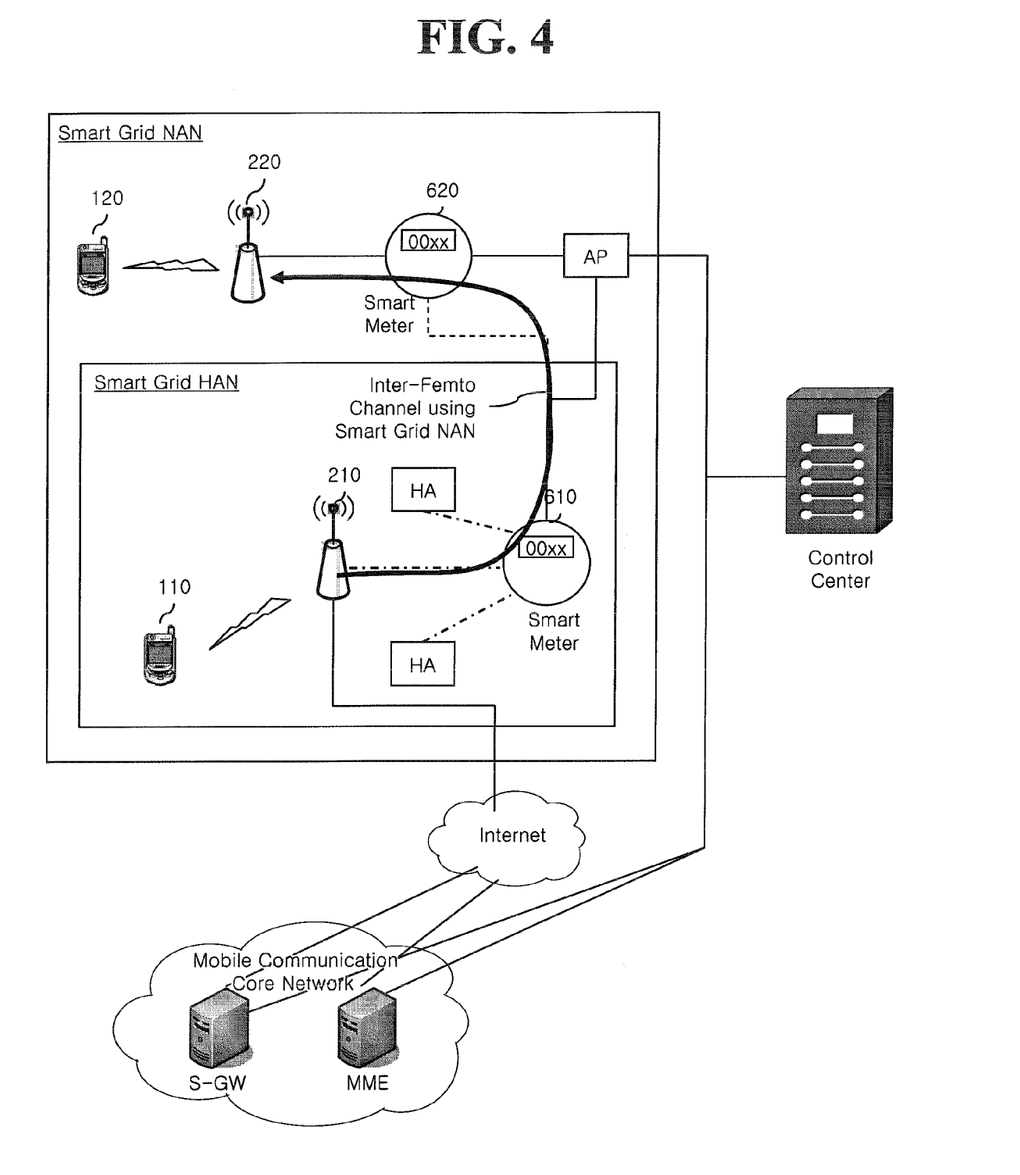
FIG. 4 is a view illustrating an architecture in which a femto base station and smart grid are coupled to each other.

FIG. 4 is a view illustrating an architecture in which a femto base station and smart grid are coupled to each other according to one embodiment of the present invention.

Figure 3:
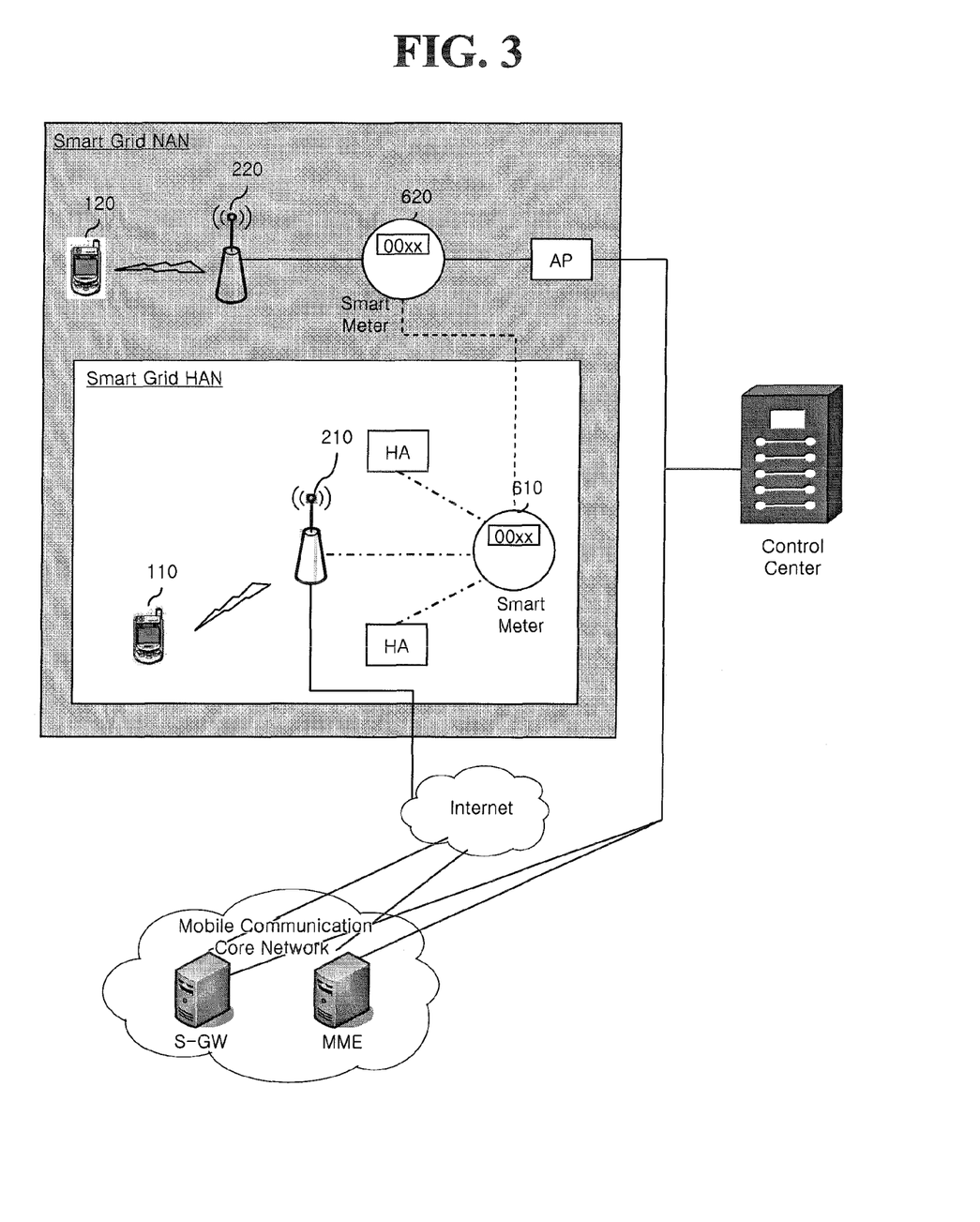
FIG. 3 is a view illustrating the concept of Smart Grid which is newly proposed in recent times.

Referring to FIG. 3, one or more smart meters 610 and 620 is connected to a home appliance (HA) such as a refrigerator, a washing machine and a television, and is also connected to one or more femto base stations 200.

The smart meters 610 and 620 support short-range communications, such as WiFi, Bluetooth, Wireless USB and USN. And, terminals 110 and 120 support the short-range communications, such as WiFi, Bluetooth, Wireless USB and USN, as well as cellular communications. Therefore, the smart meters 610 and 620 can communicate with the terminals 110 and 120.

First femto base station 210 and second femto base station 220 support at least two interfaces. That is, the first femto base station 210 supports a first interface with the first terminal 110, and a second interface with the first smart meter 610. Likewise, the second femto base station 220 supports at least two interfaces. And, the first and second femto base stations 210 and 220 support a third interface connected to the Internet.

More specifically, the first interface of the first femto base station 210 or the second femto base station 220 may be GSM, CDMA, WCDMA, LTE, IEEE 802.16, Zigbee, WiFi, Bluetooth, and so on.

The second interface of the first femto base station 210 or the second femto base station 220 may be Zigbee, WiFi, PLC, Bluetooth, USN, and so on. Through such connections, the first femto base station 210 or the second femto base station 220 may exchange control information with the first smart meter 610 or the second smart meter 620. And, the first or second femto base station 210 or 220 may access a smart grid network, by being connected to the first or second smart meter 610 or 620.

The third interface of the first or second femto base station 210 or 220 allows the femto base station 200 to be connected to a mobile communication core network via the Internet. The mobile communication core network includes Serving Gateway (S-GW) and Mobility Management Entity (MME). Therefore, the smart meter 600 can communicate with a mobile communication network through the femto base station 200.

The smart meter 600, the HA, and the femto base station 200 constitute a smart grid HAN (Home Area Network) by being connected to each other.

Therefore, the first femto base station (FBS1) 210 can transceive data with the neighbor second femto base station (FBS2) 220 via a smart grid network to which the first smart meter 610 is connected.

The smart meters 600 are connected to a control center (e.g., Smart Grid Operation/Control Center) through an access point (AP), thereby being controlled by the control center.

The smart meters 600 are connected to each other, thereby constituting a Neighborhood Area Network (NAN). The NAN allows distributed automation and an Advanced Metering Interface (AMI) function, so that intelligent energy can be supplied to the HAN. The HAN is connected to a Wide Area Network (WAN) via the AP, and is controlled by the Smart Grid Operation/Control Center of the WAN.

The smart meters 600 may be connected to each other via the WAN by being directly connected to the WAN, without constituting the NAN. For instance, the smart meters 600 can be connected to each other in a wireless manner using WiMAX, 3GPP LTE and RF mesh technologies, or in a wired manner using PLC, light, a coaxial cable, etc. If the smart meters 600 are connected to each other in a long-distance communication manner using technology of 3GPP LTE, WiMAX, etc., reliable and rapid connections can be implemented in the aspect of distributed automation. Especially, if the smart meters 600 are connected to each other by using RF mesh technology thus to constitute the NAN, the smart meters can directly communicate with each other. Alternatively, the smart meters 600 can communicate with each other via the AP, without using RF mesh technology.

So far, explained was the architecture in which the femto base station and the smart grid are coupled to each other according to one embodiment of the present invention. Hereinafter, will be explained a channel setting method between neighbor femto base stations under such architecture.

The channel setting methods according to preferred embodiments of the present invention may be categorized into three methods according to a configuration of a smart grid network connected to a femto base station.

The channel setting methods via a smart grid network between neighbor femto base stations may be variable according to a case where the smart meters are connected to each other in a mesh manner, a case where the smart meters are connected to the AP to constitute a NAN, and a case where the smart meters are directly connected to a smart grid WAN.

In all the three cases, data transmission is performed through a smart grid network which can guarantee QoS. As a result, data transmission can be performed between femto base stations, more rapidly than in the conventional art where data transmission is performed to neighbor femto base stations via a broadband network of a femto base station. Furthermore, power consumption at the femto base station can be minimized by differently applying a channel scheduling method according to the purpose of channel setup.

Hereinafter, the above three methods will be explained with reference to FIGS. 4 to 6.

FIG. 4 is a view illustrating a channel setting method according to one embodiment of the present invention.

As shown in FIG. 4, if the smart meters are connected to each other in a mesh manner, a channel is setup between neighbor femto base stations. If the smart meters are connected to each other in a mesh manner, each smart meter has information on routing, thereby enabling communication between the smart meters based on corresponding information. Explanations about a routing protocol in a mesh-type network structure have been already disclosed. Therefore, the same explanations will be omitted in the present invention.

As shown in the drawing, when a first femto base station 210 needs to perform direct communication with a neighbor second femto base station 220, the first femto base station 210 transmits a channel setup request message, to a first smart meter 610 connected thereto. The first smart meter 610 transmits the channel setup request message, to a second smart meter 620 connected to the second femto base station 220. The second smart meter 620 transmits the channel setup request message, to the second femto base station 220. The second femto base station 220 transmits a response message to the first femto base station 210, and the response message is transmitted to the first femto base station 210 through the second smart meter 620 and the first smart meter 610. Once a channel is setup between the first femto base station 210 and the second femto base station 220 through such procedure, direct communication can be performed.

Figure 5:
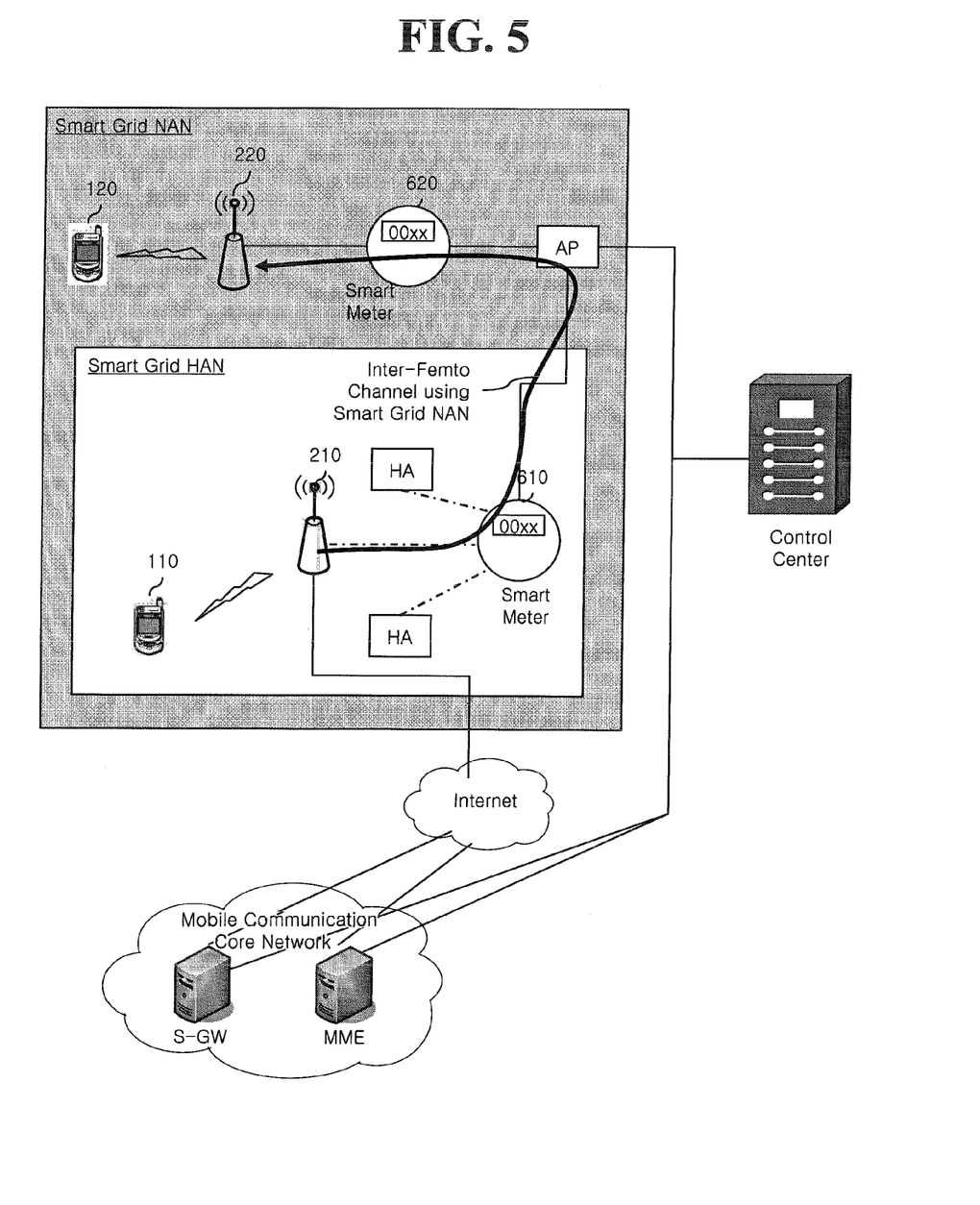
FIG. 5 is a view illustrating a channel setting method according to another embodiment of the present invention.

FIG. 5 is a view illustrating a channel setting method according to another embodiment of the present invention.

As shown in FIG. 5 according to another embodiment of the present invention, if smart meters 610 and 620 are connected to each other via an access point (AP), a channel is setup between neighbor femto cells.

When first femto base station 210 needs to perform direct communication with neighbor second femto base station 220, the first femto base station 210 transmits a channel setup request message, to the first smart meter 610 connected thereto. The first smart meter 610 transmits the channel setup request message to AP. The AP transmits the channel setup request message, to the second smart meter 620 connected to the second femto base station 220. Then, the second smart meter 620 transmits the channel setup request message, to the second femto base station 220. The second femto base station 220 transmits a response message to the first femto base station 210, and the response message is transmitted to the first femto base station 210 via the AP, the second smart meter 620 and the first smart meter 610. Once a channel is setup between the first femto base station 210 and the second femto base station 220 through such procedure, direct communication can be performed.

Figure 6:
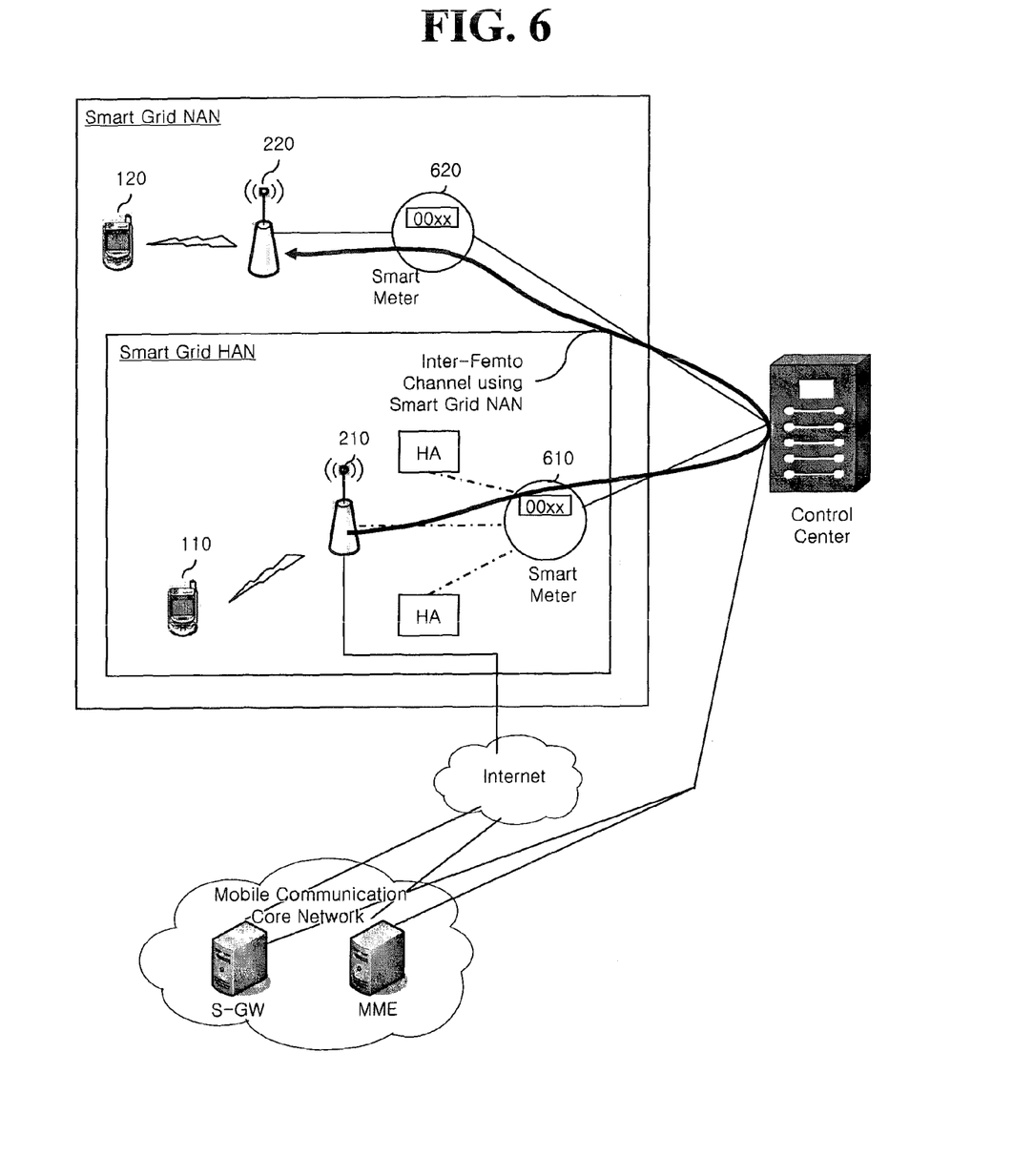
FIG. 6 is a view illustrating a channel setting method according to still another embodiment of the present invention.

FIG. 6 is a view illustrating a channel setting method according to still another embodiment of the present invention.

As shown in FIG. 6 according to still another embodiment of the present invention, if smart meters 610 and 620 are connected to a smart grid core network via a smart grid WAN, a channel is setup between neighbor femto cells. In this case, since the smart meters are directly managed by the smart grid core network, communication between the smart meters for communication between neighbor femto cells can be controlled by the smart grid core network.

When first femto base station 210 needs to perform direct communication with neighbor second femto base station 220, the first femto base station 210 transmits a channel setup request message, to the first smart meter 610 connected thereto. The first smart meter 610 transmits the channel setup request message to a node inside a smart grid core network, e.g., a control center. The node inside the smart grid core network, e.g., the control center transmits the channel setup request message, to the second smart meter 620 connected to the second femto base station 220. Then, the second smart meter 620 transmits the channel setup request message, to the second femto base station 220. The second femto base station 220 transmits a response message to the first femto base station 210, and the response message is transmitted to the first femto base station 210 via the node inside the smart grid core network (e.g., control center), the second smart meter 620 and the first smart meter 610.

Even if the channel setting method shown in FIG. 6 is similar to the methods shown in FIGS. 4 and 5, channel setup and an operation between neighbor femto base stations may be controlled by the node inside the smart grid core network (e.g., control center). That is, whether to manage corresponding channel traffic or whether to allow channel setup may be controlled by the node inside the smart grid core network (e.g., control center).

Figure 7:
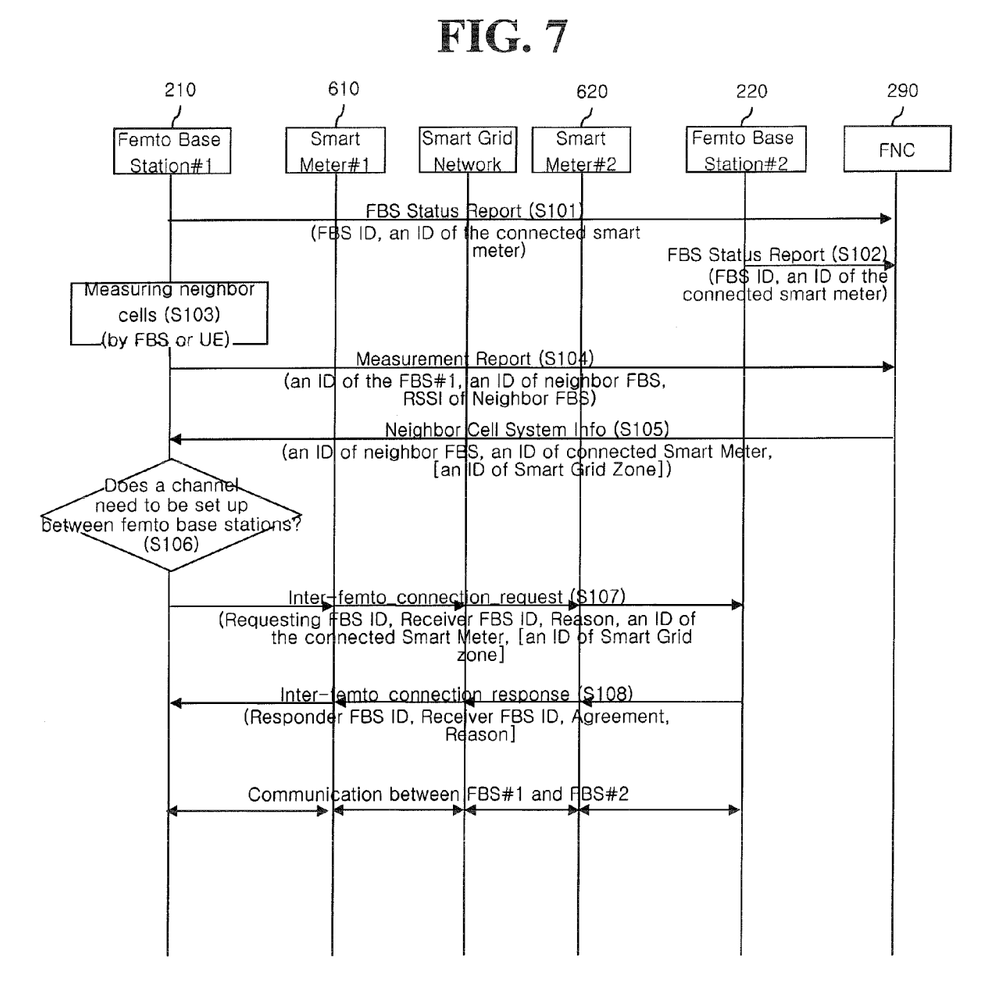
FIG. 7 is an exemplary flowchart illustrating the three channel setting methods of FIGS. 4 to 6.

FIG. 7 is an exemplary flowchart illustrating the three channel setting methods of FIGS. 4 to 6.

Hereinafter, a common principle applied to the three channel setting methods will be mainly explained, and an additional explanation about each method will be performed when necessary.

The first femto base station 210 and the second femto base station 220 are connected to the first smart meter 610 and the second smart meter 620, respectively, through a wireless communication such as Zigbee, WLAN and UWB. And, the first and second femto base stations 210 and 220 continue to communicate with the first and second smart meters 610 and 620, thereby being controlled by the first and second smart meters 610 and 620. Alternatively, the first and second femto base stations 210 and 220 maintain a data transmission enabled state therebetween through the smart meters.

1) The first femto base station (FBS#1) 210 transmits, to femto control station (FNC) 290, a report message including information on a connected smart meter, e.g., FBS_status_report (S101). The report message, e.g., the FBS_status_report message may include an FBS ID parameter indicating an ID of the first femto base station 210, and an ID of connected smart meter parameter indicating an ID of a currently-connected smart meter. The ID of connected smart meter may be obtained by the first femto base station, when the first smart meter 610 periodically broadcasts. Alternatively, the ID of connected smart meter may be obtained by the first smart meter 610, when the first femto base station 210 is connected to the first smart meter 610.

2) Likewise, the second femto base station (FBS#2) 220 transmits, to the femto control station (FNC) 290, a report message including information on a connected smart meter, e.g., FBS_status_report (S102).

3) The first femto base station (FBS#1) 210 periodically searches for neighbor cells (S103). The search may be directly performed by the first femto base station (FBS#1) 210. Alternatively, a terminal connected to the first femto base station (FBS#1) 210 may perform the search, and may transmit the result to the first femto base station 210.

4) The first femto base station (FBS#1) 210 transmits, to the femto control station (FNC) 290, a measurement report message including the result of the search (S104). The measurement report message include a parameter indicating an ID of the first femto base station (FBS#1) 210 (e.g., an ID of the FBS#1), a parameter indicating an ID of a searched neighbor base station (e.g., an ID of neighbor FBS), and a parameter indicating a signal strength of a searched neighbor base station (e.g., RSSI of neighbor FBS).

5) Upon receipt of the measurement report message, the femto control station (FNC) 290 identifies neighbor femto base stations of the first femto base station (FBS#1) 210. Then, the FNC 290 determines whether the identified neighbor femto base stations have a previously-received status report message. If the identified neighbor femto base stations have a previously-received status report message, information on the smart meters included in the status report message is identified. And, the FNC 290 transmits, to the first femto base station (FBS#1) 210, system information on neighbor cells including information on smart meters to which the identified neighbor femto base stations are connected, respectively. The system information on neighbor cells may further include a parameter indicating an ID of a neighbor femto base station. And, the system information on neighbor cells may further include a parameter indicating an ID of a smart grid zone where a corresponding base station is located. The ID of the smart grid zone may be used as an identifier for identifying a corresponding smart grid zone, when the smart grid network is divided into a plurality of zones. The ID of the smart grid zone may allow a specific smart meter to be rapidly searched, by searching for smart meters in units of zones in the smart grid network. And, the ID of the smart grid zone may efficiently allocate identifier resources by differently allocating identifiers of smart meters to each zone. As the identifier resources, an IP address (IPv4, IPv6), an identifier code inside a specific smart gird network and so on may be used.

6) The FNC 290 receives the system information on neighbor cells from the first femto base station (FBS#1) 210, and stores the system information.

Then, the first femto base station (FBS#1) 210 determines whether to setup a channel with the second femto base station 220 (S106). The channel setup is performed when control information is exchanged for prevention of interference, or when data of terminals is transceived for handover of the terminals.

The first femto base station (FBS#1) 210 determines whether channel setup with the second femto base station 220 can be performed through the first smart meter. That is, the first femto base station (FBS#1) 210 identifies whether there is any smart meter to which the second femto base station 220 is connected. Such process may be performed based on a parameter inside the received system information on neighbor cells.

7) If channel setup is required as a result of the determination, the first femto base station (FBS#1) 210 transmits, a connection request message, to the first smart meter 610 to which the first femto base station 210 is connected, e.g., Inter Femto Connection Request message (S107).

If mesh-type smart meters are implemented as shown in FIG. 4, the first smart meter 610 identifies whether a smart grid network to which the first smart meter 610 is connected corresponds to the second smart meter 620 to which the second femto base station is connected. Then, the first smart meter 610 transmits, to the second smart meter 620, a connection request message via the smart grid network.

As shown in FIG. 5, if the first smart meter 610 is connected to a smart grid network via an AP, the first smart meter 610 transmits, to the AP, a connection request message. Then, the AP transmits the connection request message to the second smart meter.

As shown in FIG. 6, if the smart grid network to which the first smart meter 610 is connected is a smart grid WAN via a control center, the first smart meter 610 transmits, to the control center, a connection request message. Then, the control center transmits the connection request message to the second smart meter. Here, the control center may control channel setup. That is, the control center may perform controls with respect to whether a corresponding channel can be setup, whether a corresponding channel can undergo traffic processing, etc.

Upon receipt of the connection request message, the second smart meter 620 transmits the connection request message to the second femto base station.

The connection request message may include at least one of a parameter indicating an ID of the first femto base station (FBS#1) 210 (e.g., Requesting FBS ID), a parameter indicating an ID of a femto base station which is to receive a message (e.g., Receiver FBS ID), a parameter indicating a channel setup reason (e.g., Reason), a parameter indicating an ID of a connected smart meter (e.g., an ID of the connected Smart Meter), and a parameter indicating an ID of a smart meter to which a femto base station which is to receive a message is connected. The ID of a smart meter to which a femto base station which is to receive a message is connected, may be obtained based on the system information on neighbor cells. And, the connection request message may further include a parameter indicating an ID of a smart grid zone.

Information included in the parameter indicating a channel setup reason (e.g., Reason) is used to determine a channel operating method between neighbor femto base stations based on corresponding information. More specifically, after a channel is setup, the channel is operated in a manner most suitable for the reason. And, the femto base stations are made to operate the channel only at required times. This can minimize power consumption. A basic value of the information indicates that the femto base station should maintain a reception standby state with respect to a connection with the smart meter, for communication with one or more neighbor femto base stations.

8) The second femto base station 220 having received the connection request message transmits, to the second smart meter 220, a connection response message (e.g., Inter Femto Connection Response) (S108). The connection response message is transmitted to the first femto base station in the reverse order to S107.

The connection response message may include a parameter indicating an ID of a responsive femto base station (i.e., the second femto base station), a parameter indicating an ID of a recipient of the connection response message (i.e., the first femto base station), a parameter indicating whether to allow with respect to a connection request (e.g., Agreement parameter), and a reason parameter indicating a reason why the connection request is allowable or non-allowable.

9) Upon receipt of the response message, the first femto base station 210 identifies the parameter included in the response message, the parameter indicating whether to allow with respect to a connection request. If the connection request is allowed, the channel setup is completed, and data transception with the second femto base station 220 is performed via the setup channel. The channel passes through the first smart meter and the second smart meter.

The explained methods of the present invention may be implemented by using, computer software, hardware, or some combination thereof. For instance, the method of the present invention may be stored in a storage medium (e.g., inner memory, flash memory, hard disc, etc.), or may be implemented in codes or commands inside a software program that can be executed by a processor (e.g. micro processor). This will be explained in more details with reference to FIG. 8.

Figure 8:
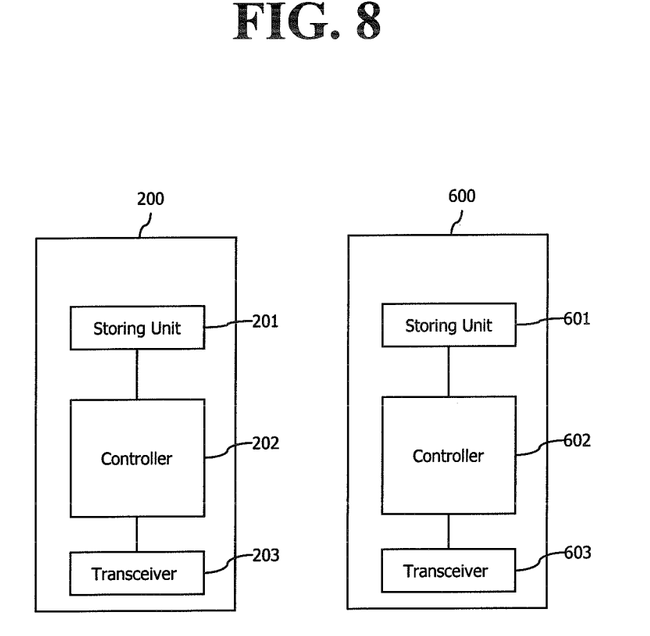
FIG. 8 is a block diagram illustrating configurations of the femto base station 200 and the smart grid 600.

FIG. 8 is a block diagram illustrating configurations of the femto base station 200 and the smart grid 600.

As shown in FIG. 8, the femto base station 200 includes a storage means 201, a controller 202 and a transceiver 203. And, the smart grid 600 includes a storage means 601, a controller 602 and a transceiver 603.

The storage means 202 and 602 are configured to store therein the methods shown in FIGS. 3 to 6.

The controllers 202 and 602 is configured to control the storage means 201 and 601, and the transceivers 203 and 603. More specifically, the controllers 202 and 602 execute the methods stored in the storage means 201 and 601, respectively. And, the controller 202 and 602 transmit the aforementioned signals via the transceivers 203 and 603

It will also be apparent to those skilled in the art that various modifications and variations can be made in the present invention without departing from the spirit or scope of the invention. Thus, it is intended that the present invention cover modifications and variations of this invention provided they come within the scope of the appended claims and their equivalents.

The invention claimed is:

1. A method in which a first femto base station sets up a channel with another femto base station, the method comprising:
    transmitting, from the first femto base station to a femto control station, information on a first smart meter to which the first femto base station is connected;
    transmitting, from the first femto base station to the femto control station, information on one or more other femto base stations which are neighbors of the first femto base station;
    receiving, by the first femto base station and from the femto control station, information on a second smart meter to which said one or more other femto base stations are connected;
    determining, by the first femto base station, whether or not to set up a channel through the first smart meter and the second smart meter, if data to be transmitted to said other femto base stations exists;
    transmitting, from the first femto base station to the first smart meter, a channel setup request message containing information on said other femto base stations and information on the second smart meter in accordance with the result of the determination; and
    transceiving, by the first femto base station, the data to/from said other femto base stations via the channel setup through the first smart meter and the second smart meter, when a response message is received from said other femto base stations through the first smart meter.

2. The method of claim 1, wherein the information on the first smart meter is transmitted while being included in a status report message.

3. The method of claim 1, wherein the information on said one or more other femto base stations is transmitted while being included in a measurement report message.

4. The method of claim 1, wherein the information on the second smart meter is received while being included in a system information message about neighbor cells.

5. The method of claim 4, wherein the system information message further includes at least one of information on said other femto base stations, and an identifier inside a smart grid zone where the smart meter is located.

6. The method of claim 1, wherein the channel setup request message further includes at least one of information on the first femto base station, a parameter indicating a channel setup reason, and an identifier inside a smart grid zone where the smart meter is located.

7. The method of claim 1, wherein the information on said one or more other neighbor femto base stations is obtained through measurement by the first femto base station, or is obtained through measurement by a terminal connected to the first femto base station.

8. A method for setting up a channel between femto base stations, in which a first smart meter connected to a first femto base station sets up a channel for the first femto base station, the method comprising:
    transmitting, from the first smart meter, to a first femto base station connected to the first smart meter, information on the first smart meter;
    receiving, by the first smart meter and from the first femto base station, a connection request message with a second femto base station;
    identifying by the first smart meter based on the connection request message, a second smart meter to which the second femto base station is connected; and
    transmitting, from the first smart meter, to the identified second smart meter, the connection request message.

9. The method of claim 8, wherein the connection request message further includes at least one of information on the first femto base station, a parameter indicating a channel setup reason, and an identifier inside a smart grid zone where the smart meter is located.

10. A femto base station, comprising:
    a transceiver configured to transmit, to a femto control station, information on a first smart meter to which the femto base station is connected, and information on one or more other femto base stations which are neighbors of the femto base station, and configured to receive, from the femto control station, information on a second smart meter to which said one or more other femto base stations are connected; and
    a processor configured to determine whether to setup a channel through the first smart meter and the second smart meter, if data to be transmitted to said other femto base stations exists,
    wherein the transceiver is configured to transmit, to the first smart meter, a channel setup request message including information on said other femto base stations, and information on the second smart meter, based on the determination result by the processor, and
    wherein the transceiver transceives the data to/from said other femto base stations via the channel setup through the first smart meter and the second smart meter, when a response message is received from said other femto base stations through the first smart meter.

11. The femto base station of claim 10, wherein the information on the is first smart meter is transmitted while being included in a status report message.

12. The femto base station of claim 11, wherein the information on said one or more other femto base stations is transmitted while being included in a measurement report message.

13. The femto base station of claim 10, wherein the information on the second smart meter is received while being included in a system information message about neighbor cells.

14. The femto base station of claim 13, wherein the system information message further includes at least one of information on said other femto base stations, and an identifier inside a smart grid zone where the smart meter is located.

15. The femto base station of claim 10, wherein the information on said one or more other neighbor femto base stations is obtained through measurement by the first femto base station, or is obtained through measurement by a terminal connected to the first femto base station.

* * * * *